3,016,328
DIALDEHYDE ALCOHOLIC SPORICIDAL COMPOSITION
Rollin E. Pepper, East Lansing, Mich., and Emanuel R. Lieberman, Somerville, N.J., assignors to Ethicon, Inc., a corporation of New Jersey
No Drawing. Filed Jan. 3, 1961, Ser. No. 79,966
36 Claims. (Cl. 167—22)

This is a continuation-in-part of application Serial No. 843,297, filed September 29, 1959 which in turn is a continuation-in-part of application Serial No. 692,581, filed October 28, 1957, both now abandoned.

This invention relates to improved chemical sterilization compositions and to methods for sterilizing with these compositions.

Steam sterilization under pressure has long been accepted as the ideal and most efficient means for disinfection. However, this method does not lend itself to wide applicability, being cumbersome, tedious and time consuming. Moreover, it requires expensive equipment and skilled technicians. Too, steam sterilization is clearly impracticable where it is desired to disinfect such objects as hospital beds; walls; floors; or delicate instruments which are sensitive to elevated temperatures.

A considerable amount of research has been devoted in recent years to finding an adequate method for quick sterilization, and many substitutes have been devised to replace steam sterilization. Since the time of Lister, phenol and the various cresols have been employed for this purpose, but these substances are extremely odorous. The same is true of formaldehyde which, although admittedly effective, has an extremely objectionable odor. The lower alkanols, such as isopropyl alcohol and ethanol, have been used extensively, as have the quaternary ammonium compounds. None of these, however, has been accepted as an adequate substitute for the phenolic compounds.

Among the desiderata for chemical sterilization agents there may be mentioned. (a) ability to penetrate tissue debris; (b) non-corrosiveness; and (c) non-toxicity. Heretofore, no chemical disinfectant has been found which possesses all of the attributes.

The disinfecting power of a chemical sterilization agent can best be measured by its ability to kill sporulating bacteria, such as those which cause tetanus and gas gangrene. Most of the chemical sterilization agents presently in use do have the ability to kill vegetative bacteria, but very few, if any, are capable of killing spores such as *Clostridium sporogenes*, *Clostridium tetani*, *Bacillus subtilis* and *Bacillus pumilus*. Formaldehyde compositions such as formaldehyde-alcohol solutions do have the ability to kill a variety of resistant spores but (as noted above) they have objectionable properties which make them none too desirable for use as chemical disinfectants.

We have now discovered a method for chemical sterilization which overcomes many of the disadvantages of the prior art methods and provides novel compositions which can be used for effecting such sterilization. These novel compositions comprise, broadly, a mixture of a saturated dialdehyde, a lower alkanol containing from one to three carbon atoms and an alkali metal carbonate or bicarbonate alkalinating gent. They possess surprising disinfectant properties which are superior to many of the known chemical sterilization agents. The novel compositions of this invention are capable of killing bacteria and bacterial spores within a shorter period of time than is required for many presently-known chemical disinfectants. They retain their germicidal potency on storage, are without disagreeable odor or appearance, and have a broad spectrum of bactericidal and sporicidal activity. As the lower alkanol component, isopropanol is preferred although methanol, ethanol and n-propanol are also useful. The alkanols are advantageously employed in an aqueous system at a final concentration of from about 50% to about 80% preferably from about 60% to about 70%.

The saturated dialdehydes which may be employed in the novel compositions of this invention are those containing from 2 to 6 carbon atoms. They may alternatively be referred to as n-alkane-α-ω-dicarboxaldehydes wherein the alkane moiety is from 0 to 4 carbon atoms. More specifically, these compounds include malonaldehyde, succinaldehyde, oxaldehyde(glyoxal), adipaldehyde and, preferably, glutaraldehyde. Further, the dialdehyde may be in its basic form or in the form of an adduct, such as an alkali metal bisulfite adduct, e.g., glutaraldehyde bisulfite.

Glutaraldehyde as well as other simple dialdehydes such as those mentioned above, have found many industrial applications. In fact some have been used in the disinfectant field. However, although glutaraldehyde as such possesses some physical advantages over formaldehyde in that it has a mild odor and is non-irritating to the skin and mucous membranes, it cannot be classified as an effective chemical sterilization agent since it does not meet sporicidal requirements. The improvement of the present invention resides in the discovery that a saturated dialdehyde containing 2 to 6 carbons does, in fact, have sporicidal activity when it is combined with a lower alkanol and an alkalinating agent. Significant, in this respect, is the finding that the choice diluent, i.e., lower alkanol, and alkaline additive are important in preparing sporicidally effective solutions. It is noteworthy that a combination of dialdehyde and alkanol does not show the spore killing activity demonstrable by a combination of dialdehyde-alkanol-alkaline additive.

In accordance with one embodiment of the present invention, the novel sporicidal composition is prepared by dissolving 0.3 gram of sodium bicarbonate and 1 gram of a saturated dialdehyde, preferable glutaraldehyde, in a sufficient quantity of distilled water to make a final 30% volume to which a sufficient quantity of isopropyl alcohol is added to make a 100% volume mixture containing a final volume of 70% isopropyl alcohol. This solution was tested for its germicidal and sporicidal properties in accordance with the method described by Chandler, Pepper and Gordon (J. Amer. Pharm. Asso. Sci. Ed., 1957, v. 46, No. 2, 124–128). Briefly, this test comprises exposing bacteria or bacterial spores to the test solution for a period of approximately 18 hours (or less) at a temperature of 22–23° C., and then transferring an aliquout to an apparatus containing a Millipore filter membrane. By applying vacuum to the system, the liquid is drawn through the membrane causing the microorganisms to impinge onto the surface of the membrane filter. After the membrane is washed with successive filtrations of water, the filter membrane is aseptically transferred to liquid culture media which are known to support the growth of such microorganisms. The cultures (including controls) are incubated at 37° C. for 30 days, at which time the test is terminated. If no growth is observed in the liquid culture media, the solution is considered bactericidal or sporicidal (as the case may be), after confirmation of killing activity is made by inoculating such culture media with the microorganism used in the original test and reincubating to rule out bacteriostasis or sporistasis.

Table I below shows the sporicidal activities of solutions containing 1% glyoxal, 70% isopropyl alcohol and varying amounts of sodium bicarbonate. Exposure: 18 hours at 20° to 23° C.

TABLE I

| 1% glyoxal test solution NaHCO$_3$, percent | Results after 30 days | | | |
| --- | --- | --- | --- | --- |
| | Cl. sporogenes | Cl. tetani | P. subtilis | Bacillus sp. |
| 0.1 | ++ | +− | ++ | ++ |
| 0.15 | −− | −− | −− | −− |
| 0.2 | −− | −− | −− | −− |
| 0.3 | −− | −− | −− | −− |
| 0.4 | −− | −− | −− | −− |
| 0.5 | −− | −− | −− | −− |

Note.—+ = growth. − = No growth.

As alkalinating agents in the novel composition of this invention there may be used any of the alkali metal carbonates or bicarbonates, such as for example, sodium bicarbonate, potassium bicarbonate, sodium carbonate or potassium carbonate.

As noted above, the choice of diluent is an important and novel feature of the present invention. The importance of the diluent is illustrated in Table II below, which compares the sporicidal activity of a 1% glyoxal solution containing identical quantities of sodium bicarbonate but including in the one case 70% isopropyl alcohol as the diluent, and in the other distilled water as the diluent. Exposure: 4 hours at 20° to 25° C.

TABLE II

| 1% glyoxal test solution | | Results after 30 days | | | |
| --- | --- | --- | --- | --- | --- |
| Diluent | Alkaline additive | Cl. sporogenes | Cl. tetani | P. subtilis | Bacillus sp. |
| 70% IPI [1] | 0.5% NaHCO$_3$ | −− | −− | −− | −− |
| Dist. H$_2$O | 0.5% NaHCO$_3$ | ++ | ++ | ++ | ++ |

[1] Isopropyl alcohol.
Note.—+ = growth. − = No growth.

Although the final volume concentration of isopropyl alcohol may be varied within certain limits, a final concentration of about 70% has been found most desirable since this concentration gives optimal sporicidal results. However, reasonable variations of this concentration will also give satisfactory results, as illustrated in Table III below, which shows the sporicidal activity of glyoxal compositions containing varying volumes of isopropyl alcohol. The test organism was B. subtilis. Exposure: 4 hours at 25° C.

TABLE III [1]

| Percent glyoxal | Percent NaHCO$_3$ | Percent isopropyl alcohol | Days incubated | Results |
| --- | --- | --- | --- | --- |
| 1 | 0.5 | 65 | 10 | − |
| 1 | 0.5 | 70 | 10 | − |
| 1 | 0.5 | 75 | 6 | − |
| 1 | 0.3 | 80 | 6 | − |
| 1 | 0.2 | 85 | 6 | − |

[1] Results obtained after 30 days.
Note.—+ = Growth. − = No growth.

Further, Table IV shows not only that the dialdehyde concentration can be varied over wide limits without departure from 4-hour kill-time, but also that alkanols other than isopropanol may be successfully employed in the novel combinations. Table IV shows sporicidal activity of glutaraldehyde compositions containing 70% ethanol and 0.3% NaHCO$_3$. Test organisms: *Bacillus subtilis*, *Bacillus pumilus*, *Clostridium tetani* and *Clostridium sporogenes*.

TABLE IV

| Glutaraldehyde concentration, percent | Hours exposure | | | | | | | | |
| --- | --- | --- | --- | --- | --- | --- | --- | --- | --- |
| | 0.5 | | 1 | | 2 | | 3 | | 4 |
| | E | T | E | T | E | T | E | T | E | T |
| 0.125 | + | + | + | + | + | + | + | − | − | − |
| 0.25 | + | + | + | + | + | + | − | − | − | − |
| 0.5 | + | + | + | + | + | − | − | − | − | − |
| 1.0 | + | + | + | + | − | − | − | − | − | − |

Note.—E = Eugon broth. T = Fluid thioglycollate medium. + = Growth. − = No growth.

In order to demonstrate the operability of other carbonates and bicarbonates, a series of tests was carried out employing compositions containing 1% glyoxal in 70% isopropyl alcohol made alkaline with sodium bicarbonate (for comparison), sodium carbonate, potassium bicarbonate and potassium carbonate. The results are shown in Table V below. Exposure: 18 hours at 20° to 23° C.

TABLE V

| Test material (in 70% isopropyl alcohol) | Cl. sporogenes | Cl. tetani | B. subtilis | Bacillus sp. |
| --- | --- | --- | --- | --- |
| 1% glyoxal-0.5% NaHCO$_3$ | − | − | − | − |
| 1% glyoxal-0.17% Na$_2$CO$_3$ | − | − | − | − |
| 1% glyoxal-0.5% KHCO$_3$ | − | − | − | − |
| 1% glyoxal-0.25% K$_2$CO$_3$ | − | − | − | − |
| 1% glyoxal | + | + | + | + |

Note.—+ = Growth. − = No growth.

Although the alkali metal carbonates and bicarbonates are preferred alkalinating agents, a limited number of amines may also be used for this purpose. Amines which we have found useful are: diethylaminoethanol, triethylamine, dibutylamine, and dimethylaminoethanol. Results of tests conducted with these alkalinating agents are shown in Table VI below and include a mixture of 1% glyoxal and 0.5% sodium bicarbonate in 70% isopropyl alcohol for comparison. The test organism was B. subtilis. Exposure: 18 hours at 20° to 23° C.

TABLE VI

| Test material | Results after 30 days | | | |
| --- | --- | --- | --- | --- |
| | Cl. sporogenes | Cl. tetani | B. subtilis | Bacillus sp. |
| 1% glyoxal-1% diethylaminoethanol in 90% IPA,[1] pH 10.05 | − | − | + | − |
| 1% glyoxal-1% triethylamine in 90% IPA, pH 10.65 | − | − | + | − |
| 1% glyoxal-1% dibutylamine in 90% IPA, pH 10.35 | − | − | + | + |
| 1% glyoxal-1% dimethylaminoethanol in 90% IPA, pH 10.5 | − | − | − | − |
| 1% glyoxal-0.5% NaHCO$_3$ in 70% IPA | − | − | − | − |

[1] Isopropyl alcohol.
Note.—+ = Growth. − = No growth.

It has been demonstrated above (Table I) that the novel compositions of this invention possess effective sporicidal action when exposed to test organisms for a period of 18 hours. However, one of the novel features of this invention includes the discovery that the composition is capable of effecting sporicidal activity within a relatively short period of time. In fact, it is this characteristic which distinguishes the composition from other well-known chemical sterilization agents. Table VII below illustrates the sporicidal activity of a mixture of 1% glyoxal in 70% isopropyl alcohol made alkaline with 0.5% sodium bicarbonate against four test organisms for periods of time varying from 1 to 7 hours. Exposure temperature: 20° to 23° C.

TABLE VII

| Hours exposure | Results after 30 days ||||
| --- | --- | --- | --- | --- |
| | Cl. sporogenes | Cl. tetani | B. subtilis | B. pumilus |
| 1 | + | + | + | + |
| 2 | + | + | + | + |
| 3 | − | − | + | − |
| 4 | − | − | − | − |
| 5 | − | − | − | − |
| 6 | − | − | − | − |
| 7 | − | − | − | − |

Note.—+ = growth. − = No growth.

Yet another unique and outstanding characteristic of the compositions of this invention is their stability. The claimed compositions retain their germicidal and sporicidal activities for as long as one year after the date of preparation. Table VIII below illustrates the ability of the novel compositions to retain their sporicidal activities over prolonged storage at room temperature (approximately 22° to 24° C.). The test solutions used in these experiments comprised a mixture containing 1% dialdehyde and 70% isopropyl alcohol made alkaline with various amounts of sodium bicarbonate. Exposure: 18 hours at 20° to 23° C.

TABLE VIII

| Age of solution when tested | NaHCO₃, percent | Cl. sporogenes | Cl. tetani | B. subtilis | Bacillus sp. |
| --- | --- | --- | --- | --- | --- |
| Initial test | 0.15 | − | − | +− | +− |
| | 0.2 | − | − | +− | − |
| | 0.3 | − | − | − | − |
| | 0.4 | − | − | − | − |
| | 0.5 | − | − | − | − |
| 2 weeks (glyoxal) | 0.15 | − | − | ++ | −+− |
| | 0.2 | − | − | − | − |
| | 0.3 | − | − | − | − |
| | 004 | − | − | − | − |
| | 0.5 | − | − | − | − |
| 4 weeks (glyoxal) | 0.15 | − | − | ++ | ++ |
| | 0.2 | − | − | − | − |
| | 0.3 | − | − | − | − |
| | 0.4 | − | − | − | − |
| | 0.5 | − | − | − | − |
| 9 months (glutaraldehyde) | 0.3 | | | | |

Note.—+ = growth. − = No growth.

The quantity of saturated dialdehyde which may be used in the claimed compositions may vary from about 0.01% to about 1% depending upon which particular dialdehyde is selected. Moreover, one may safely depart from this concentration without seriously detracting from its effectiveness. For example, if desired, the final concentration of dialdehyde may be increased up to as much as 10% or decreased as low as 0.005%. However, amounts in excess of 1% are unnecessary and wasteful. In actual practice a range from about 0.01% to about 1% is preferred. Table IX below illustrates the variable concentrations of glyoxal which may be at 25° C. Days incubation: 30.

TABLE IX[1]

| Percent glyoxal | Percent NaHCO₃ | Percent IPA | Results |
| --- | --- | --- | --- |
| 9.0 | 0.5 | 70 | − |
| 5.0 | 0.5 | 70 | − |
| 1.0 | 0.5 | 70 | − |
| 0.5 | 0.5 | 70 | − |
| 0.4 | 0.4 | 70 | − |
| 0.3 | 0.3 | 70 | − |
| 0.25 | 0.3 | 70 | − |

| Percent glutaraldehyde | Percent NaHCO₃ | Percent IPA | Results |
| --- | --- | --- | --- |
| 5.0 | 0.3 | 70 | −− |
| 4.0 | 0.3 | 60 | −− |
| 2.0 | 0.3 | 70 | −− |
| 0.09 | 0.3 | 70 | −− |

[1] Results obtained after 30 days.
Note.—+ = growth. − = No growth.

The glyoxal which may be employed in formulating the compositions of this invention may be (a) commercial aqueous glyoxal solution usually available in 30% concentration and containing impurities such as formic acid, ethylene glycol and glycollic acid, (b) pure aqueous glyoxal solution, free of contaminants and impurities, and usually available in 30% concentration or (c) dry, solid glyoxal prepared by spray-drying either the commercial or the pure aqueous glyoxal in the presence of an alkali metal salt. In the latter case, a sporicidally-active composition is obtained either by admixing the solid, dry glyoxal, obtained by spray-drying, as such, with the required volume of isopropyl alcohol or, if desired, supplementing the already present alkali metal salt content with an additional quantity of alkali metal salt, i.e., from about 0.1% to about 1%, preferably from about 0.1% to about 0.5% by weight. Table X shows the results obtained when compositions prepared with spray-dried, solid, dry glyoxal (wherein the liquid glyoxal was obtained from commercial sources) were tested for sporicidal activity. Table XI shows the results obtained when compositions prepared with spray-dried, solid, dry glyoxal (wherein the glyoxal was in substantially pure form) were tested for the same activity. Note: In the Tables X and XI any solution where results are shown for Eugon broth only, B. subtilis spores were used. Where results are shown for Eugon broth and Fl. Thioglycollate, the following spores were used:

*Bacillus subtilis*
*Bacillus pumilus*
*Clostridium sporogenes*
*Clostridium tetani*

TABLE X

| Percent glyoxal | NaHCO₃ ||| pH | Eugon broth |||| Fl. thio. ||||
| --- | --- | --- | --- | --- | --- | --- | --- | --- | --- | --- | --- | --- |
| | Present initial dissolution, percent | Added, percent | Total, percent | | 1 | 2 | 3 | 4 | 1 | 2 | 3 | 4 |
| 1 | 0.5 | ---- | 0.5 | 7.7 | + | + | + | − | ++ | +− | − | − |
| 1 | 0.4 | ---- | 0.4 | 7.75 | + | + | + | + | ++ | ++ | +− | − |
| | 0.4 | 0.2 | 0.6 | 8.10 | + | + | − | − | +− | − | − | − |
| 1 | 0.3 | ---- | 0.3 | 6.95 | ++ | ++ | ++ | ++ | − | − | − | − |
| 1 | 0.3 | 0.2 | 0.5 | 8.45 | + | + | − | − | ++ | +− | − | − |
| | KHCO₃ present in powder, percent | | | | | | | | | | | |
| 1 | 0.5 | ---- | 0.5 | 8.75 | + | − | − | − | | | | |

Note.—+ = Growth. − = No growth.

TABLE XI

| Percent glyoxal | NaHCO₃ Present in powder, percent | NaHCO₃ Added, percent | NaHCO₃ Total, percent | pH | Eugon broth 1 | 2 | 3 | 4 | Fl. thio. 1 | 2 | 3 | 4 |
|---|---|---|---|---|---|---|---|---|---|---|---|---|
| 1 | None | -------- | None | 5.15 | + | + | + | + | + | + | + | + |
| 1 | None | 0.1 | 0.1 | 7.85 | + | + | + | + | + | + | + | − |
| 1 | None | 0.2 | 0.2 | 8.55 | + | + | − | − | + | + | + | − |
| 1 | None | 0.3 | 0.3 | 8.55 | + | + | − | − | + | + | − | − |
| 1 | None | 0.4 | 0.4 | 8.95 | + | − | − | − | − | + | − | − |
| 1 | 0.1 | -------- | 0.1 | 8.5 | + | + | + | + | + | + | + | + |
| 1 | 0.1 | 0.1 | 0.2 | 8.55 | + | + | − | − | + | − | − | − |
| 1 | 0.1 | 0.2 | 0.3 | 8.95 | + | − | − | − | + | − | − | − |
| 1 | 0.1 | 0.3 | 0.4 | 9.15 | − | − | − | − | + | − | − | − |

Note.—+ = Growth. − = No growth.

In order to demonstrate that dialdehydes containing 2 to 6 carbon atoms other than glyoxal may be used in formulating the novel compositions of this invention, data are given below for such other dialdehydes. Table XI shows results obtainable with glutaraldehyde as the dialdehyde component, and Table XII shows results obtainable with succinaldehyde as the dialdehyde component. Tests organisms: *Cl. sporogenes, Cl. tetani, B. subtilis* and *B. pumilus*.

TABLE XII

| Glutaraldehyde, percent | NaHCO₃ percent | IPA,[1] percent | pH | Eugon broth 0 | ½ | 1 | 2 | 3 | 4 | Fl. thio. 0 | ½ | 1 | 2 | 3 | 4 |
|---|---|---|---|---|---|---|---|---|---|---|---|---|---|---|---|
| 1 | 0 | 70 | 4.8 | | | | | + | | | | | | | + |
| 1 | 0.3 | 70 | 8.9 | + | − | − | − | − | − | + | − | − | − | − | − |
| 0.5 | 0.3 | 70 | 9.3 | + | − | − | − | − | − | + | − | − | − | − | − |
| 0.5 | 0.2 | 70 | 8.7 | + | − | − | − | − | − | + | − | − | − | − | − |
| 0.25 | 0.3 | 70 | 8.75 | + | − | − | − | − | − | + | − | − | − | − | − |
|  | 0.2 | 70 | 8.65 | + | − | − | − | − | − | + | − | − | − | − | − |
|  | 0.1 | 70 | 8.55 | + | − | − | − | + | − | + | − | − | − | − | − |
| 0.125 | 0.3 | 70 | 9.40 | + | + | − | − | − | + | | | | | | |
|  | 0.2 | 70 | 9.35 | + | + | − | − | − | + | + | − | − | − | − | − |
|  | 0.1 | 70 | 8.95 | | + | + | + | + | + | | | | | | |
| 0.03 | 0.3 | 70 | 9.24 | + | + | + | + | + | + | + | + | + | + | + | + |
| 0.06 | 0.3 | 70 | 9.30 | + | + | + | − | − | + | + | + | − | + | | |
| 0.09 | 0.3 | 70 | 9.35 | + | − | − | − | − | + | | | | | | |
| 0.125 | 0.3 | 70 | 9.35 | | − | − | − | − | + | | | | | | |
| 0.125 | 0 | 70 | 6.75 | + | + | + | + | + | | + | + | + | + | + | |
| 0 | 0.3 | 70 | 9.45 | + | + | + | + | + | + | | + | + | + | + | |

[1] Isopropyl alcohol, aqueous.
Note.—+ = Growth. − = No growth.

TABLE XIII

| Succinaldehyde, percent | NaHCO₃, percent | IPA[1], percent | Eugon broth 0 | ½ | 1 | 2 | 3 | 4 | Fl. thio. 0 | ½ | 1 | 2 | 3 | 4 |
|---|---|---|---|---|---|---|---|---|---|---|---|---|---|---|
| 1 | 0.5 | 70 | + | − | − | − | − | − | + | − | − | − | − | − |
| 0.5 | 0.3 | 70 | + | + | − | − | − | − | + | − | − | − | − | − |
| 0.5 | 0.3 | 70 | + | + | − | − | − | − | + | − | − | − | − | − |
| 0.25 | 0.3 | 70 | + | + | + | + | − | − | + | − | − | − | − | − |
| 0.25 | 0.3 | 70 | + | + | + | + | + | − | + | − | − | − | − | − |
| 0.25 | 0.2 | 70 | + | + | + | + | − | − | + | − | + | − | − | − |
| 0.25 | 0.2 | 70 | + | + | + | + | + | − | + | − | − | − | − | − |

[1] Isopropyl alcohol, aqueous
Note.—+ = Growth. − = No growth.

The uses to which the novel compositions may be applied particularly because of their non-corrosive character, are many and varied. In the surgical and medical fields, various types of instruments and appliances may be safely sterilized by immersion for a period of about 2 to 12 hours at room temperature. As examples of objects suitable for chemical sterilization according to this invention may be given: catheters, clamps, forceps; needles; syringes; scissors; scalpels; thermometers; eye, ear, nose and throat instruments; etc. In home and industry, the novel compositions may be used in a similar manner to sterilize dishes, eating utensils, enamelware, etc., as well as for disinfection of walls, floors, beds, etc., the latter being accomplished by washing the objects with the dialdehyde-isopropyl alcohol-alkaline mixture.

Two pieces of each of the following catheters (approx. 2.5 cm.): (1) red rubber, approx. 3 mm., (2) brown latex, approx. 13 mm., (3) white latex, approx. 5 mm., and (4) polyethylene, 3 mm. O.D., were placed in an aqueous suspension of *B. subtilis* spores containing about $4 \times 10^3$/ml. After agitation to insure thorough contamination of each piece, the catheter pieces were removed, placed within the folds of a dry towel, and placed in the 37° C. incubator overnight to dry. The following day, each piece was placed into a glyoxal solution of the following composition:

| | | |
|---|---|---|
| Glyoxal (30% aqueous) | ml | 16.5 |
| NaHSO₃ | gm | 2.5 |
| Dist. H₂O | ml | 133.5 |
| 99–100% IPA | ml | 350 |
| | ml | 500 |

One of each type was removed about one minute later and placed in media for the purpose of testing for viability and sporistasis. The others were kept in the solution for 4 hours at approximately 23° C., whereupon, they were transferred to media to test for sterility. All tests were incubated at 37° C.

| Type of catheter | Results (after 6 days) 1 minute exposure | 4 hour exposure |
|---|---|---|
| Red rubber | + | − |
| Brown latex | + | − |
| White latex | + | − |
| Polyethylene | + | − |

Note.—+ = Growth. − = No growth.

Although, as noted heretofore, the novel combination of dialdehyde-alkanol-alkalenating agent produces extremely desirable results with respect to kill-time against a variety of strongly resistant spores, it possesses certain limitations which, from a broad utilitarian view, should be overcome if one desires to apply the inventive concept to a wide variety of surgical, medical or household materials.

It is an accepted fact that lower alkanols have a deterioration effect on such materials as rubber, certain plastics, lenses and on cements used in the optical field. When articles of this type are exposed to alcoholic solutions, particularly on a repetitive basis over protracted periods of time, the instruments and appliances lose their original characteristics because of corrosion, pitting, delamination or other detrimental effects, resulting in a short lifetime of usefulness. Further, if the materials to be sterilized have not been thoroughly cleansed, possible protein precipitation may occur with attendant danger of spore-encapsulation.

To eliminate, or at least minimize, this detraction from the novel compositions of this invention it has been determined that content modification of the alkaline component permits complete elimination of the alkanol without substantial reduction in gross sporicidal effectiveness of the final mixture. Thus one may employ, in the manner more fully described below, a combination of certain of the dialdehydes mentioned above and an alkalinating agent, to obtain substantially the same sporicidal effect as if a lower alkanol were included in the composition. The omission of the alkanol eliminates the troublesome problems of deterioration and protein precipitation, without loss of sporicidal force.

Dialdehydes found to be most useful in formulating the novel sporicidally-active aqueous system, in combination with an alkalinating agent, are succinaldehyde and glutaraldehyde. Of these, the latter is preferred. It may be employed in the commercially-available liquid form or as the solid mono-inorganic acid salt adduct obtained by spray-drying. Although optimal concentration of the dialdehyde was found to be about 1%, it may be successfully employed at concentrations as low as about 0.25% and as high as 4%. In fact concentrations higher than this may be used safely, if so desired.

The mechanism which permits the deletion of the alkanol component with concurrent retention of sporicidal activity cannot be postulated with absolute and unequivocal certainty at the present time. Solubility parameters of aqueous-alkanol systems place a limit on the quantity and type of alkalinating agent which may be introduced into such systems. For example, although a base such as sodium bicarbonate must be present in the final solution if sporicidal effect is to be obtained, its solubility does not usually exceed about 0.3% for the sporicidally effective compositions contemplated within the scope of the present invention. If the alkanol is omitted and the concentration of alkali is maintained at 0.3% a pH value in excess of 7.4 cannot be achieved. This, in turn, places a parallel restriction on the sporicidal activity of the solution. However, deletion of the alkanol permits addition of larger quantities of alkalinizing agents, such alkali metal bicarbonates, thereby reducing the hydrogen ion concentration, and causing a substantial rise in pH values.

That an increase in pH plays an important role in imparting sporicidal activity to the modified dialdehyde compositions is amply demonstrated by the data in Tables X and XI. It will be seen that spore-kill can be obtained in one-half to one hour with an aqueous alkanol-glutaraldehyde composition containing 0.3% sodium bicarbonate. If the alkaline concentration is maintained at the same level and the isopropanol is omitted, spore-kill is also obtainable but at the end of a longer period of time, i.e., about six hours. If, in the same type of system, the bicarbonate concentration is increased, there is a corresponding reversal in the length of time required to obtain sporicidal action.

Although an alkali metal bicarbonate, such as sodium bicarbonate or potassium bicarbonate, is the preferred alkalinating agent in the aqueous system, one may advantageously employ (as in the case of the aqueous-alkanolic system) alkali metal carbonates, alkali metal hydroxide, secondary amines or tertiary amines instead of or in combination with (in various proportions) the alkali metal bicarbonates. Exemplary amines include dialkylaminoalkanols, trialkylamines and dialkylamines.

A positive circumference cannot be placed about the concentration limits of the alkalinating agent, since the quantity to be employed depends upon the nature of the dialdehyde, its physical state and its pH value. If it is weakly acidic, a relatively small quantity of base will be required. If it should be strongly protonic, more alkali will be needed. It can be stated however, that a sufficient quantity of alkalinating agent should be used to insure a pH value in excess of 7.4 in the final solution. Depending upon the nature of the alkalinating agent selected, this is achieved either with a single base or a combination of bases. In the case of alkali metal bicarbonates, maximum pH range attainable is from 7.5 to about 8.0. If higher values are desired, the bicarbonate may be supplemented with a quantity of a more strongly basic agent such as an alkali metal carbonate. Yet another combination which may be advantageously used is diethylamino ethanol and an alkali metal carbonate or bicarbonate.

It will be readily apparent to those skilled in the art that, although relatively high pH values may be gained by using one or more suitable bases, practicability places a restriction as to the hydroxyl ion concentration of the final solution. Thus, although values as high as 12 or 13 may be readily achieved, such strongly alkaline solutions cannot be used in everyday medical practice. Accordingly, one will find it expedient to add a sufficient amount of base to attain a final pH range of from about 7.5 to about 10. A pH range of from about 8.0 to about 9.5 has been found most suitable. This is particularly true in the case of bicarbonates which exert a buffering action in high pH ranges.

Referring now to both the aqueous-alkanolic and the aqueous systems described above, it will be apparent that, in actual practice, the final solutions will not be prepared by the ultimate user until the need for them arises. This will be true despite the favorable results in stability studies (supra) obtained with both systems. The logical approach therefore, is to make the components available to the ultimate consumer in such form that simple admixture with the selected solvent system will give the desired sporicidally active composition. It is in this respect that the present invention lends itself to a modification which permits wide access to the key components of the sporicidal solution without necessitating commercial transport of large volumes of fluid.

Among the disadvantages of commercially available saturated dialdehydes, such as glutaraldehyde, is that they are difficult to handle and following admixture with alkali, have a limited shelf-life. Thus, it is impractical to prepare on a comercial scale, either the aqueous or the aqueous-alkanolic solution with incorporated dialdehyde and alkaline components. As an alternative however, one may make available the latter two components in proper proportions with directions for admixture with required volume of the solvent system of choice.

Availability of an indefinitely stable, solid, dialdehyde-alkali system is made possible by spray-drying a dialdehyde such as glutaraldehyde, in the form of an aqueous solution, in the presence of an inorganic sulfur acid salt. The resultant product, a solid, free-flowing powder, is the corresponding dialdehyde monosulfur acid salt which can be readily admixed with a solid alkalinating agent. The dual combination, if kept free of moisture, will remain stable indefinitely, may be used to prepare extemporaneously a sporicidal solution by simple addition to the required volume of water or aqueous alkanol.

As a specific example of the preparation of a stable dialdehyde adduct, potassium metalsulfite is dissolved in a 25% aqueous solution of glutaraldehyde and the solution is spray-dried at an inlet temperature of 250° F. and an outlet temperature of 180° F. The product, potassium glutaraldehyde monobisulfite, is a colorless free-flowing powder. Other dialdehyde adducts such as the monosulfoxylate, are prepared in a similar manner.

What is claimed is:

1. A sporicidal composition comprising a saturated dialdehyde containing from 2 to 6 carbons, a lower alkanol and an alkalinating agent.

2. A sporicidal composition as set forth in claim 1 wherein the alkalinating agent is an alkali metal salt selected from the group consisting of carbonates and bicarbonates.

3. A sporicidal composition as set forth in claim 1 wherein the alkalinating agent is a member of the group consisting of diethylaminoethanol, triethylamine, dibutylamine and dimethylaminoethanol.

4. A sporicidal composition comprising from about 0.01% to about 1% of a saturated dialdehyde containing from 2 to 6 carbons, an alkali metal bicarbonate and a sufficient quantity of a lower alkanol to make a final alcoholic concentration of from about 60% to about 70%.

5. A sporicidal composition comprising from about 0.2% to about 1% glyoxal, an alkali metal bicarbonate and a sufficient quantity of lower alkanol to make a final alcoholic concentration of from about 60% to about 70%.

6. A sporicidal composition comprising from about 0.2% to about 1% succinaldehyde, an alkali bicarbonate and a sufficient quantity of a lower alkanol to make a final alcoholic concentration of from about 60% to about 70%.

7. A sporicidal composition comprising from about 0.01% to about 1% glutaraldehyde, an alkali metal bicarbonate and a sufficient quantity of a lower alkanol to make a final alcoholic concentration of from about 60% to about 70%.

8. A sporicidal composition as set forth in claim 1 wherein the saturated dialdehyde is glyoxal.

9. A sporicidal composition as set forth in claim 1 wherein the saturated dialdehyde is malonaldehyde.

10. A sporicidal composition as set forth in claim 1 wherein the saturated dialdehyde is succinaldehyde.

11. A sporicidal composition as set forth in claim 1 wherein the saturated dialdehyde is glutaraldehyde.

12. A sporicidal composition as set forth in claim 1 wherein the saturated dialdehyde is adipaldehyde.

13. A sporicidal composition comprising from about 0.2% to about 1% succinaldehyde, from about 0.2% to about 0.5% sodium bicarbonate, and a sufficient quantity of a lower alkanol to make a final alcoholic concentration of from about 60% to about 70%.

14. A sporicidal composition comprising from about .01% to about 1% glutaraldehyde, from about 0.2% to about 0.5% sodium bicarbonate, and a sufficient quantity of a lower alkanol to make a final alcoholic concentration of from about 60% to about 70%.

15. A sporicidal composition comprising about 1% glyoxyl, about 0.5% sodium bicarbonate, and a sufficient quantity of a lower alkanol to make a final alcoholic concentration of from about 60% to about 70%.

16. A sporicidal composition comprising from about 0.2% to about 1% glyoxal, an alkaline metal salt selected from the group consisting of carbonates and bicarbonates and a sufficient quantity of a lower alkanol to make a final alcoholic concentration of from about 60% to about 70%.

17. A method for disinfecting medical and surgical instruments and household objects which comprises subjecting said objects to treatment with a composition comprising a saturated dialdehyde containing from 2 to 6 carbons, a lower alkanol and an alkalinating agent.

18. A method for disinfecting medical and surgical instruments and household objects which comprises subjecting said objects to treatment with a composition comprising glyoxal, a lower alkanol and an alkalinating agent.

19. A method for disinfecting medical and surgical instruments and household objects which comprises subjecting said objects to treatment with a composition comprising glutaraldehyde, a lower alkanol and an alkalinating agent.

20. A method as set forth in claim 17 wherein the alkalinating agent is an alkali metal salt selected from the group consisting of carbonates and bicarbonates.

21. A emthod for disinfecting medical and surgical instruments and household objects which comprises subjecting said insrtuments and objects to treatment with a sporicidal composition comprising from about 0.01% to about 1% saturated dialdehyde containing 2 to 6 carbons, a sufficient quantity of a lower alkanol to make a final alcoholic concentration of from about 60% to about 70%, and an alkalinating agent.

22. A method for disinfecting medical and surgical instruments and household objects which comprises subjecting said instruments and objects to treatment with a sporicidal composition comprising from about 0.2% to about 1% glyoxal, a sufficient quantity of a lower alkanol to make a final alcoholic concentration of from about 60% to about 70% and an alkalinating agent.

23. A method for disinfecting medical and surgical instruments and household objects which comprises subjecting said instruemnts and objects to treatment with a sporicidal composition comprising glutaraldehyde, a sufficient quantity of a lower alkanol to make a final alcoholic concentration of from about 60% to about 70% and an alkalinating agent.

24. A method as set forth in claim 21 wherein the alkalinating agent is an alkali metal salt selected from the group consisting of carbonates and dicarbonates.

25. A composition as set forth in claim 1 wherein the aldehyde is in the form of a mono-inorganic sulfur acid salt adduct.

26. An aqueous sporicidal composition having a pH in excess of 7.4, comprising a member selected from the group consisting of glutaraldehyde, a succinaldehyde and their mono-sulfur acid salt adducts and an alkalinating agent.

27. A sporicidal composition as set forth in claim 26 wherein the alkalinating agent is an alkali metal salt selected from the group consisting of carbonates, bicarbonates and mixtures thereof.

28. A sporicidal composition as set forth in claim 26 wherein the alkalinating agent is a member of the group consisting of dialkylaminoalkanol, trialkylamine and dialkylamine.

29. A sporicidal composition as set forth in claim 26 wherein the alkalinating agent is a mixture of a member of the group consisting of alkali metal carbonates and bicarbonates and a member of the group consisting of dialkylaminoalkanol, trialkylamine and dialkylamine.

30. A solid, stable composition of a saturated dialdehyde mono-inorganic sulfur salt adduct containing from 2 to 6 carbon atoms and an alkalinating agent.

31. A composition as set forth in claim 30 wherein the dialdehyde adduct is glutaraldehyde monobisulfite salt.

32. A composition as set forth in claim 30 wherein the dialdehyde adduct is glyoxal monobisulfite salt.

33. A composition as set forth in claim 30 wherein the dialdehyde adduct is glutaraldehyde monosulfoxylate.

34. A method for disinfecting medical and surgical instruments and household objects which comprises subjecting said objects to treatment with an aqueous composition having a pH in excess of 7.4, comprising a member selected from the group consisting of glutaraldehyde, succinaldehyde and their mono-sulfur acid salt adducts and an alkalinating agent.

35. A method for disinfecting medical and surgical instruments and household objects which comprises subjecting said objects to treatment with an aqueous composition having a pH of in excess of 7.4, comprising a member of the group consisting of glutaraldehyde and its mono-inorganic sulfur acid salt adducts, and an alkalinating agent.

36. A method as set forth in claim 17 wherein the alkalinating agent is an alkali metal salt selected from the group consisting of carbonates, bicarbonates and mixtures thereof.

References Cited in the file of this patent

UNITED STATES PATENTS

| 2,333,182 | Jones | Nov. 2, 1943 |
| 2,387,831 | Cogan et al. | Oct. 30, 1945 |
| 2,801,216 | Yoder | July 30, 1957 |

OTHER REFERENCES

McCulloch: "Disinfection and Sterilization," 2nd Ed. 1945, Lea and Febiger, Phila., pages 319, 320.

Gustavson: "The Chemistry of Tanning Processes," Academic Press, Inc., New York, N. Y., 1956, page 279.

UNITED STATES PATENT OFFICE
CERTIFICATION OF CORRECTION

Patent No. 3,016,328　　　　　　　　　　　　　　January 9, 1962

Rollin E. Pepper et al.

It is hereby certified that error appears in the above numbered patent requiring correction and that the said Letters Patent should read as corrected below.

Column 2, line 38, after "choice" insert -- of --; column 5, TABLE VIII, the heading of the second column, for "NaHCO3" read -- NaHCO$_3$ --; under "NaHCO$_3$", ninth line for "004" read -- 0.4 --; columns 3, 4, 5 and 6, same table, sixteenth line for "--------", each occurrence, read -- ― ― --; under "B. subtilis", seventh line for "―" read -- ― --; under "Bacillus sp.", the sixth line for "-+-" read -- + --; column 6, TABLE X, under "NaHCO$_3$" in the heading for the first column, after "Present" insert -- on --; column 10, line 71, after "alkali" insert -- metal --; column 11, line 51, for "emthod" read -- method --; line 68, for "instruemnts" read -- instruments --.

Signed and sealed this 26th day of June 1962.

(SEAL)
Attest:

ERNEST W. SWIDER
Attesting Officer

DAVID L. LADD
Commissioner of Patents